Sept. 18, 1934.　　　　　S. B. WINN　　　　　1,974,168
TRACTOR AND TRAILER BRAKE SYSTEM
Filed May 29, 1930　　　2 Sheets-Sheet 2
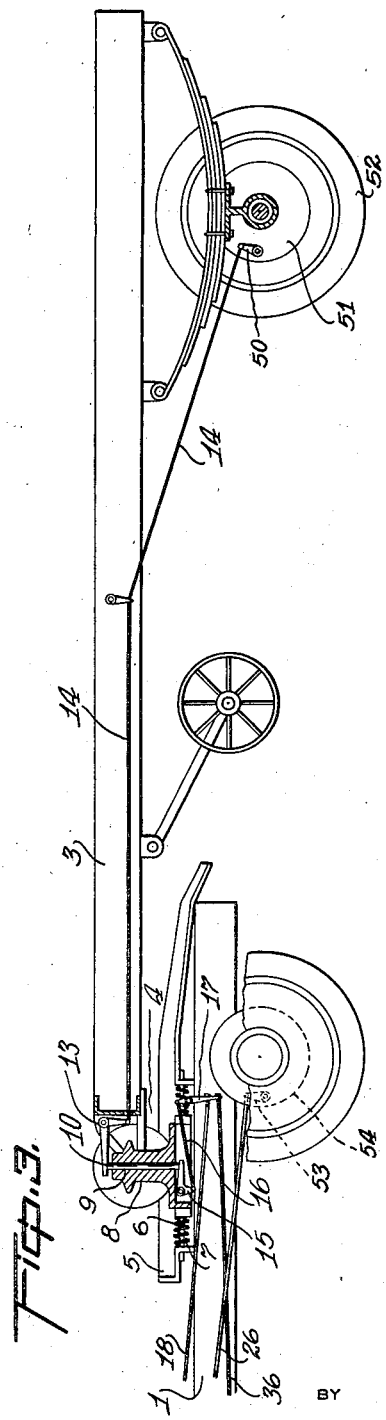
INVENTOR
*Sidney B. Winn*

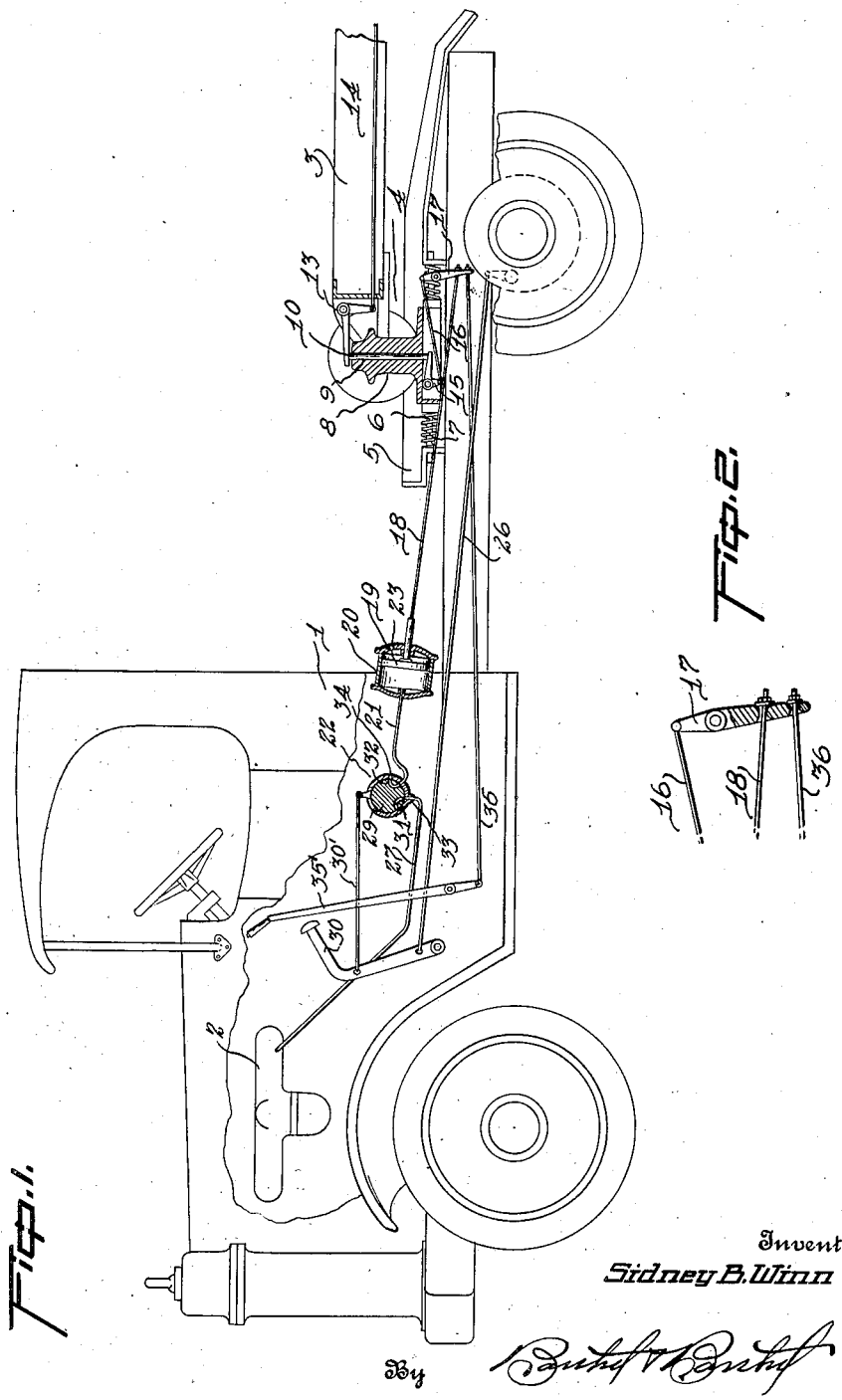

Patented Sept. 18, 1934

1,974,168

UNITED STATES PATENT OFFICE 1,974,168

TRACTOR AND TRAILER BRAKE SYSTEM

Sidney B. Winn, Lapeer, Mich.

Application May 29, 1930, Serial No. 456,948

1 Claim. (Cl. 188—3)

The present invention pertains to a novel pneumatic brake mechanism, which is particularly adapted to tractor trailer constructions and comprises an auxiliary braking means mounted upon the tractor and devised to automatically apply the brakes on the trailer when the tractor foot brake is applied.

The primary object of the present invention is to employ suction, which may be obtained by tapping into the intake manifold of the tractor motor, to apply or set the brakes mounted on the trailer at the same time that the tractor foot brakes are applied, the suction being controlled by a mechanism which is entirely mounted upon the tractor and devised to operate the trailer brakes through the king pin which provides the coupling means between the tractor and the trailer. In the present manner of construction it becomes possible to eliminate the pipe line connections usually found in pneumatic or hydraulic brake constructions which are adaptable to tractors and trailers, this feature being of paramount importance inasmuch as the safety or dependability of the brake reaches a higher degree by avoiding the necessity of having to make or break the pipe line connections between the tractor and the trailer.

In conventional pneumatic or hydraulic brakes for tractors and trailers it has heretofore been necessary to provide a hose line connecting the brakes on the trailer to the pressure source on the tractor. This construction necessitates an air hose between the tractor and trailer and the objections to the hose are many. The hose is expensive, and reliance cannot be placed upon it owing to the fact that it is not fool proof, it permitting the operator of the tractor to forget to uncouple the hose connections when uncoupling from the trailer and thereby break or destroy the hose. Again it is unsafe for the operator may forget to connect the hose connections when he couples the tractor to the trailer and he may drive away without braking connection between the foot pedal in the tractor cabin and the brakes on the trailer wheels.

With the above and other ends in view, the present invention consists in the matters hereinafter set forth and more particularly pointed out in the appended claims, reference being had to the accompanying drawings, in which Figure 1 is a side elevation of the tractor and a fragment of the trailer, both being partly broken away and in cross section;

Fig. 2 is a cross sectional detail of the brake actuating lever, and

Fig. 3 is a side elevation of the trailer and a fragment of the tractor, both being partly broken away and in cross section.

Like characters are employed throughout to designate the corresponding parts.

The numeral 1 designates a tractor which may be of any suitable type driven by an internal combustion engine having an intake manifold 2. A trailer 3 is provided and is equipped with coupling mechanism 4 adapted to cooperate with the fifth wheel construction 5 mounted upon the trailer for the purpose of connecting the tractor to the trailer. The construction illustrated is merely by way of example, it being possible to use any suitable mechanism in conjunction with the parts hereinafter to be described which go to form the present invention.

Draw bars 6 having springs 7 are provided on the fifth wheel to support a king pin 8 which is provided with a circular bore 9 in the center thereof to accommodate a push pin 10 which is adapted for reciprocal movement. A bell crank lever 13 is mounted on the trailer so that one of its arms rests upon the top of the push pin 10, the other arm being connected by the brake rod 14 to the brake actuating lever 50 that is provided on each of the brakes 51 on the trailer wheels 52.

A bell crank lever 15 is mounted beneath the king pin 8 so that one of the arms bears against the lower end of the push pin 10, the other arm being connected by a rod 16 to a rocking lever 17. The opposite end of the rocking lever 17 is connected by the rod 18 to piston 19 which is reciprocally mounted on the cylinder 20. A pipe line 21 connects the cylinder 20 on one side of the piston 19 to the valve chamber 22, the opposite wall of the cylinder being provided with a plurality of vents 23 to connect the same with the atmosphere.

The valve member 22 is provided with a rotatable member 29 which is actuated by a foot brake pedal 30 through the connection 30' when the pedal is depressed in the usual manner to apply the brakes 54 on the tractor through means of the connecting rod 26 and brake actuator 53. The rotatable member 29 has two passages 31 and 32, the passage 31 being adapted to register with the port 33 which is connected by a line 27 to the intake manifold 2 of the tractor engine in order to provide means for connecting the line 21 to the source of suction. The passage 32 is adapted to connect the line 21 to a port 34 which connects the line 21 to the atmosphere when the brake pedal 30 is in its normal inactive position.

The usual emergency or parking brake is also provided and comprises the lever 35' connected by the rod 36 to the rocking arm 17 so that by pulling back the lever 35 the rocking arm 17 causes the bell crank 15 to rock and force the push pin 10 upwardly to rock the bell crank lever 13 and thereby apply the trailer brakes through the brake rod 14.

In Fig. 2 the lever 17 is illustrated partly in cross section to show the slots 17' which are provided to receive the connecting rods 18 and 36 and permit the same to pass through the lever. It is obvious therefore that movement of the lever 17 caused by one of the rods 18 or 36 does in no manner effect the other.

Although a specific embodiment of the present invention has been illustrated and described it is to be understood that various changes may be made within the scope of the appended claims without departing from the spirit of the invention and such changes are contemplated.

What I claim is:

The combination with a tractor having an engine including a source of suction and a trailer having brakes, detachable means including a king pin for connecting said trailer to said tractor, a push pin in said king pin, a bell crank on said trailer engaging said push pin and connected to said trailer brakes, a bell crank on said tractor engaging said push pin, a rocking lever on said tractor connected to the bell crank on said tractor, a suction operated motor connected to said rocking lever, means connecting said suction operated motor to said source of suction, a valve in said means for controlling said suction, a pedal adapted to operate brakes on said tractor and operatively connected to said valve, and a manually operated lever connected to said rocking lever for operating said push pin independently of said suction operated motor.

SIDNEY B. WINN.